United States Patent [19]
Brown

[11] 3,775,671

[45] Nov. 27, 1973

[54] NUCLEAR MAGNETISM WELL LOGGING METHOD AND APPARATUS

[75] Inventor: Robert J. S. Brown, Fullerton, Calif.

[73] Assignee: Chevron Research Company, San Francisco, Calif.

[22] Filed: July 3, 1972

[21] Appl. No.: 268,287

[52] U.S. Cl. .............................................. 324/0.5 R
[51] Int. Cl. ............................................ G01n 27/78
[58] Field of Search ..................... 324/0.5 R, 0.5 G, 324/0.5 A, 0.5 AC

[56] References Cited
UNITED STATES PATENTS

| | | | |
|---|---|---|---|
| 2,999,203 | 9/1961 | Brown | 324/0.5 |
| 3,213,356 | 10/1965 | Brown | 324/0.5 |
| 3,402,343 | 9/1968 | Brown | 324/0.5 |
| 3,723,856 | 3/1973 | Brown | 324/0.5 |

*Primary Examiner*—Michael J. Lynch
*Attorney*—J. A. Buchanan

[57] ABSTRACT

A method and apparatus provided for reducing the effect of magnetic materials, such as magnetite, in an earth formation on the electrical A.C. signal induced by protons of earth formation fluids precessing under the influence of the earth's magnetic field after the establishment and interruption of a polarizing field,d in an earth formation traversed by a wellbore. In accordance with the present invention, before the polarizing field, say of magnitude $H_p$ gauss, is established within the earth formation (by passing a direct current through a field coil in a normal, first direction) the direction of the polarizing current, itself, is reversed for a predetermined time interval. Using only a single reversal of current (not oscillating)—suprisingly—demagnetizes enough of the magnetic particles within the earth formation which could cause inhomogeneities in the proton precessional field that the response characteristic of the subsequently detected A.C. signals are significantly improved, say, by twenty percent without hindering important digital control aspects of the logging process. The magnitude of the reverse field caused by the single reversal of the polarizing current (prior to establishment of the polarizing field in the earth formation) is preferably of a magnitude of, say $(-H_p)$ gauss. The reversal period can be quite short, say 1–20 milliseconds.

14 Claims, 11 Drawing Figures

United States Patent [19]
Brown
[11] 3,775,671
[45] Nov. 27, 1973
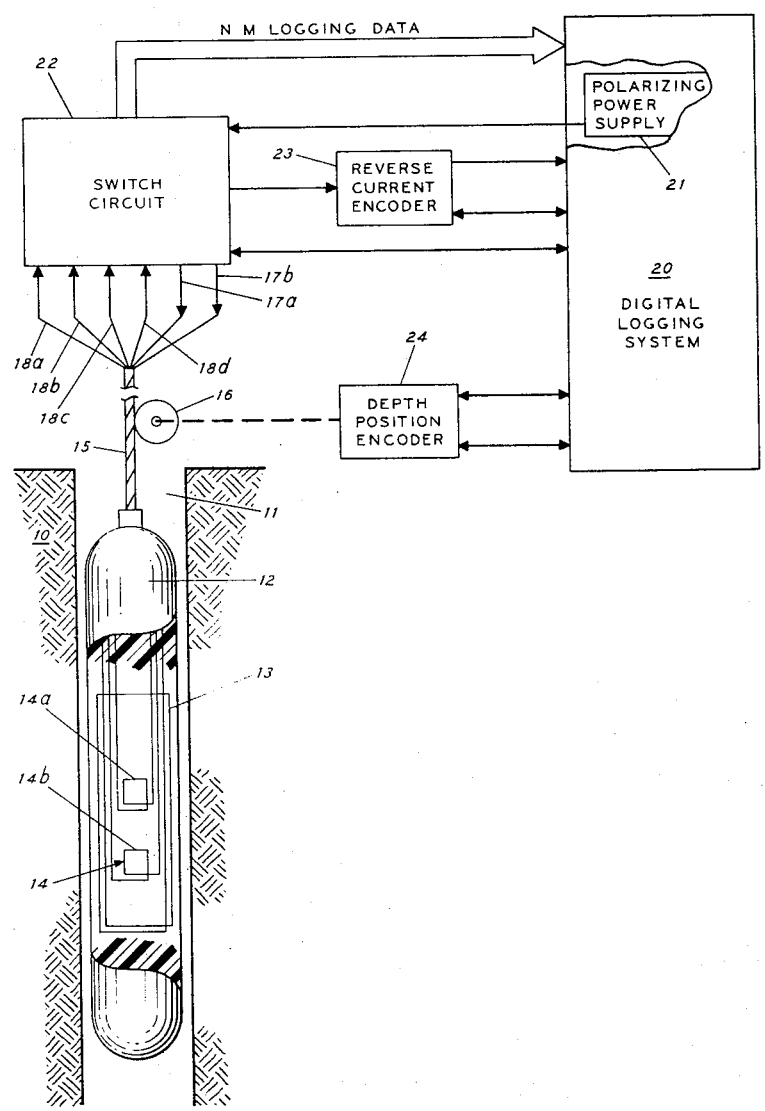

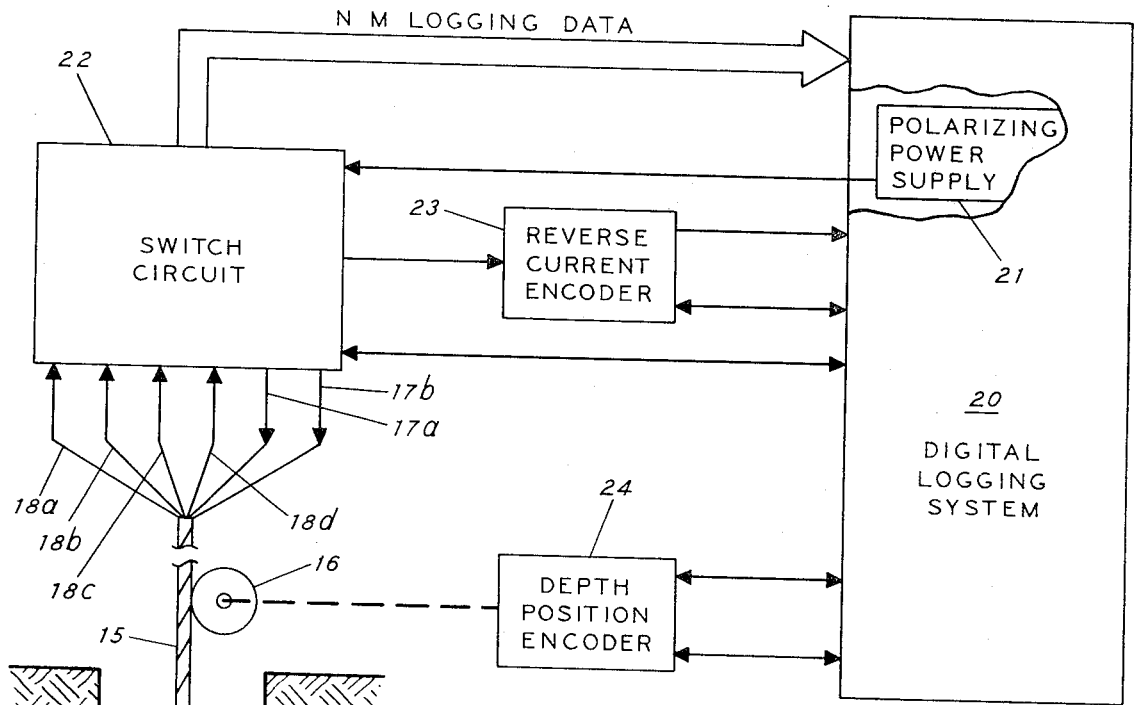
FIG.1
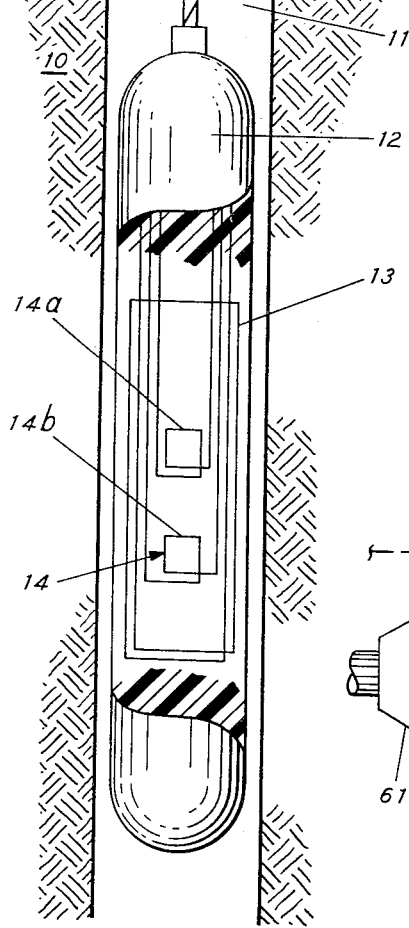
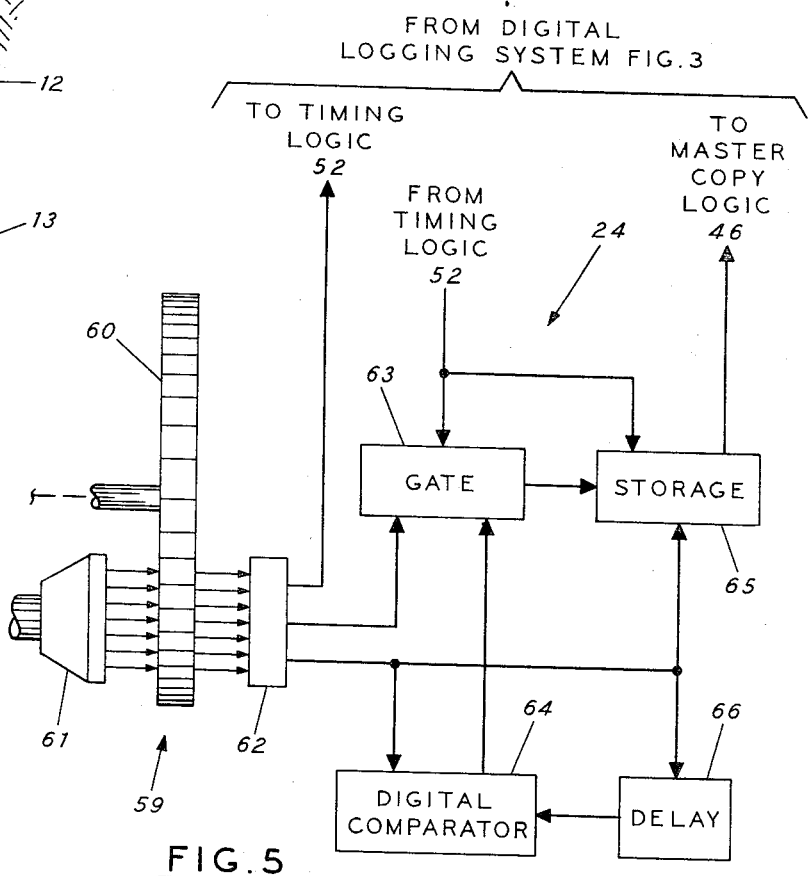
FIG.5

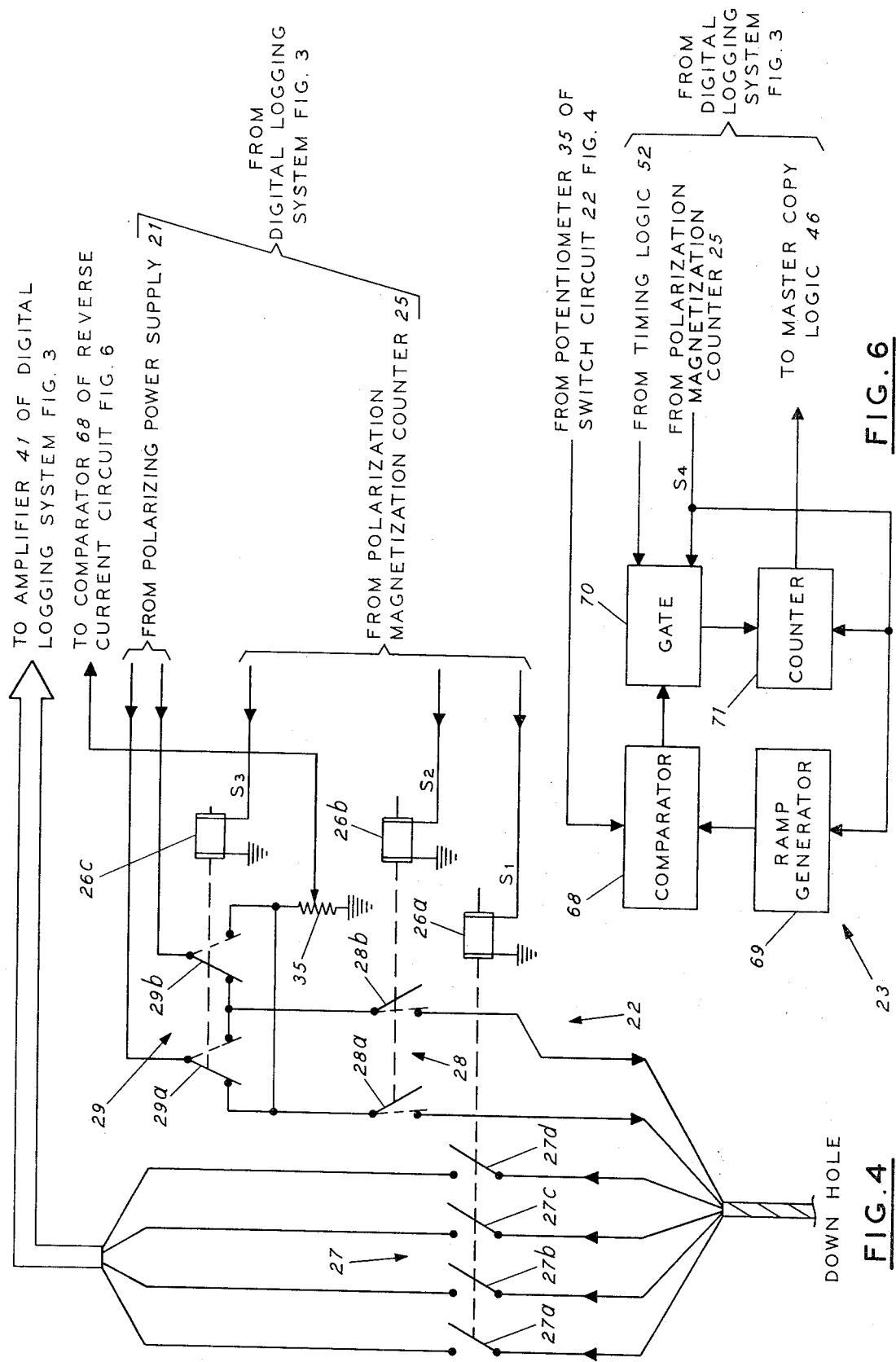

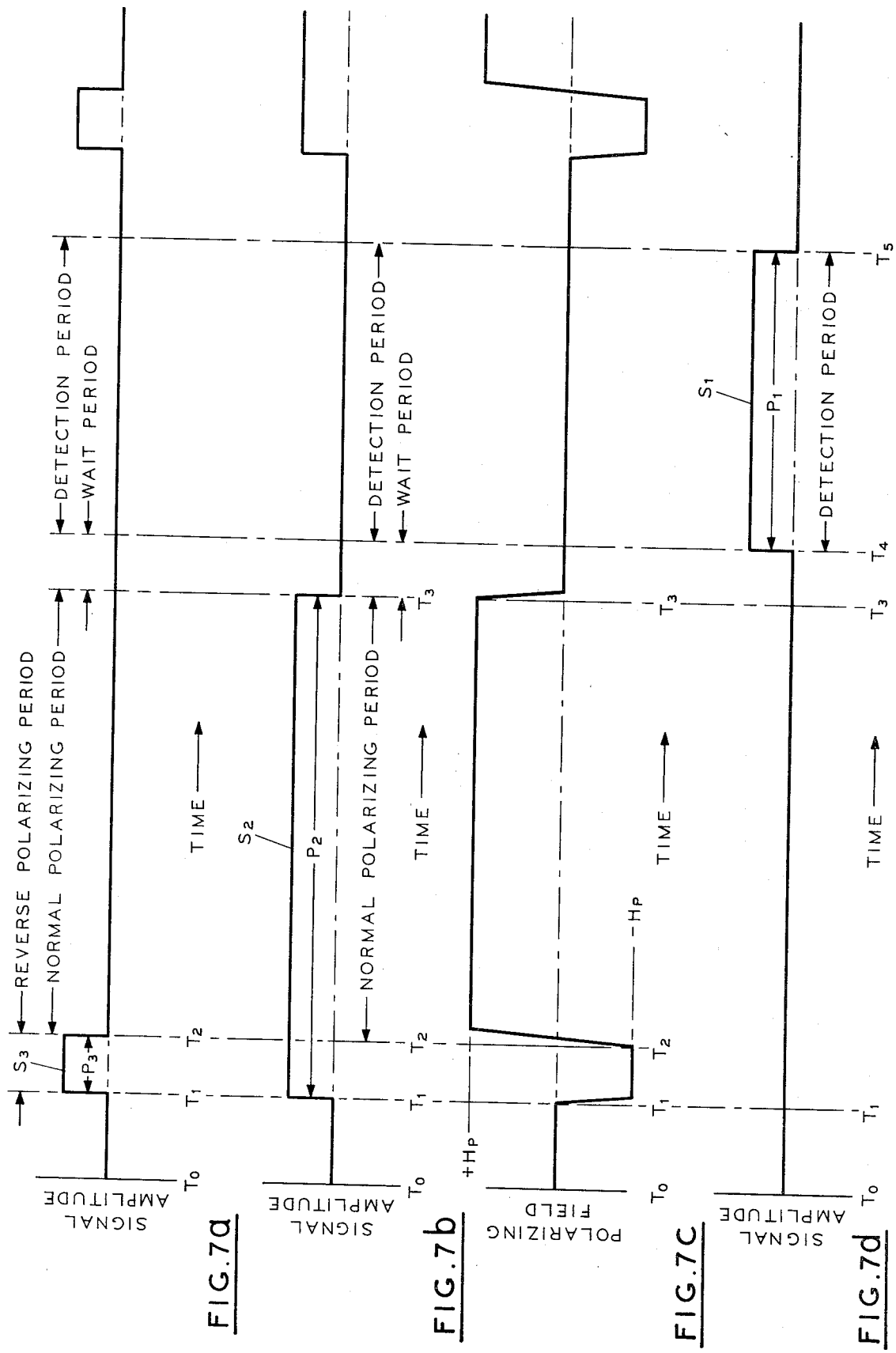

NUCLEAR MAGNETISM WELL LOGGING METHOD AND APPARATUS

BACKGROUND OF THE INVENTION

Field of the Invention

The present invention relates to nuclear magnetism well logging and particularly to a method and apparatus of reducing the effect of possible sources of magnetic field inhomogeneities within an earth formation such as magnetite, which may adversely affect a nuclear magnetism signal induced by atomic particles having nuclear magnetic moments. In accordance with the present invention, such sources are demagnetized by a controllable neutralization circuit in series with a coiled polarization conductor housed within a logging sonde positioned within a well bore penetrating the earth formation. Timing signals—preferably in pulsed code—are generated so as to control switching means in the neutralization circuit before the polarizing field is generated, and in that way, demagnetize the magnetic particles which cause inhomogeneities in the earth's magnetic field. Incremental or absolute current required for neutralization can itself be recorded in digital format on the header record section of the magnetic tape of digital recording equipment, if desired, for annotational purposes, as common during subsequent processing operations using high-speed digital computers.

OBJECT OF THE PRESENT INVENTION

An object of the present invention is the provision of a novel method and apparatus for reducing the effect of magnetic materials, such as magnetite, in an earth formation on the electrical A.C. signal induced by protons of earth formation fluids precessing under the influence of the earth's magnetic field after the establishment and interruption of a polarizing field in an earth formation traversed by a wellbore. In accordance with the present invention, before the polarizing field, say of magnitude $H_p$ gauss, is established within the earth formation (by passing a direct current through a field coil in a normal, first direction) the direction of the polarizing current, itself, is reversed for a predetermined time interval. Using only a single reversal of current (not oscillating) —surprisingly—demagnetizes enough of the magnetic particles within the earth formation which could cause inhomogeneities in the proton precessional field that the response characteristic of the subsequently detected A.C. signals are significantly improved, say, by twenty percent without hindering important digital control aspects of the logging process. The magnitude of the reverse field caused by the single reversal of the polarizing current (prior to establishment of the polarizing field in the earth formation) is preferably of a magjitude of, say $(-H_p)$ gauss. Since the polarizing field is a relatively weak one, say 200 gauss, the reversal period can be quite short, say 1–20 milliseconds.

BACKGROUND OF THE INVENTION

In nuclear magnetism logging atomic particles of the formation are first polarized in a magnetic field generated by current flow through a coiled electrical conductor. After the polarization field has been removed, and after any subsequent relaxation field has been removed, it is desirable that the protons aligned by the polarization and relaxation fields be subjected to a precession field that is, ideally, spatially uniform. By spacially uniform is meant that the precession field in the earth formation containing the protons contributing to the spin magnetic induction signals will be uniform in strength and be parallel in the vicinity of the detector employed to receive the signals. The uniformity of this field is important to the measurement of spin magnetic induction signals because of the relationship of frequency of precession, and precession field strength wherein the frequency of precession of a polarized proton is proportional to the strength of the field in which it is precessing. If the precession field is nonuniform, the rate of precession for all protons within the group will not be the same throughout the earth formation being logged, and if the rate of precession is different for certain of the protons, then the protons within the group will soon get out of phase with each other and become so randomly out of phase in their precession that there will be no cumulative signal as there would be if all protons were precessing at the same rate with individual signals reinforcing each other in the detector to produce a signal of observable strength. Summarizing the foregoing then, if the precession field is nonuniform, the spin magnetic induction signal will be weakened and may even be cancelled. Accordingly, a measureable characteristic of the resulting A. C. signal, such as decay time, or amplitude, cannot be measured and indicated as to the magnetic nature of the earth formation under survey.

In my U.S. Pat. No. 2,999,203, for "Nuclear Magnetism Logging Method and Apparatus," there is taught a method for reducing the effect of such magnetic materials in the earth formation by repeating reversing the direction of current flow in the field formation after the polarizing field has been established in the formation but prior to detection of the precessing protons. In that method, the current is caused —after reversal—to oscillate while being reduced to zero amplitude.

Today, it has become more and more the practice in the well-logging to use digital recording techniques, the resultant data—in digital format—being later precessed in conjunction with digital computers, whether such computers are located at a remote location or at the well site. owever, where the well logging measurements are derived from earth formations which include magnetite and like materials, experience has shown that control of the digital logging system to achieve demagnetization in the manner taught in my above-identified U.S. Pat. No. 2,999,203, can be difficult. E. g., to reverse the polarizing current as taught in my Patent there can be induced considerable electrical imbalance into the collection system which obliterates or otherwise interferes with the detection of the ultimate in-phase nuclear magnetic signals. Further, since the polarizing field reversal patterns are carried on after the polarizing field has been generated but before the in-phase protons signals are received, optimization of the wait-time of recording cycle may require considerable time and effort, especially if such optimization is carried out in the field.

SUMMARY OF THE INVENTION

In accordance with the preferred method for carrying out the method of the present invention, neutralization of the undesired magnetic inhomogenitieties is achieved connecting the polarizing coil within the well bore to a direct current source through digitally-controlled switch means operatively connected to a digital timing means of a digital logging system prior to the generation of the required polarization field, and not after that field has been generated as provided in my prior above identified patent. In the present invention, the reversal field should be of a magnitude approximately equal to that of the usual polarization field (but of opposite sign). Surprisingly, the single reversal is sufficient to demagnetize enough of the magnetic particles within the formation which could cause inhomogeneities in the proton precessional field that the resultant response characteristics of the detected A. C. signals are significantly improved, say by a factor of 20 percent. The reversal period of usually quite short say 1–20 milliseconds depending inter alia, upon the magnitude of the reverse and normal polarizing fields and the internal LRC circuit parameters of the polarizing coil. Only a single reversal is required. Thus, subsequent normal nuclear magnetic logging steps (i.e., polarizations, detection, digitizing and recording) are in no way inhibited even though carried out by a digital logging system (DLS) in the field.

In a preferred form of the apparatus for carrying out the method of the present invention, the polarizing coil is connected to a direct current means through switching means controlled by pulsed control signal emanating from a timing counter. Shunting the counter is an encoding circuit connected to a master copy logic circuit whereby, if desired, binary indication of the amplitude of the reverse current can be encoded directly onto the header section of the magnetic tape. Preferably, the magnetic tape is a 9-track tape in which six data tracks, one parity track, one block track and one clock track can be utilized.

Each data value as to the reversal current would be encoded on the six data tracks as required of one channel and/or adjacent channel pairs could be utilized whereby 12-bit order of data encoding, is available.

FURTHER OBJECTS OF THE INVENTION

Other objects, features, advantages of the present invention will become more apparent from the following detailed description of the present invention, with reference now being had to the accompanying drawings in which:

BRIEF DESCRIPTION OF THE DRAWINGS

FIG. 1 is a schematic representation of a nuclear magnetism logging system adapted to collect, record and encode nuclear magnetic logging signals from formation protons of an earth formation penetrated by a well bore under control of a digital logging system (DLS) used in conjunction with switching, current and depth encoding circuits;

FIGS. 4, 5 and 6 illustrate in more detail the switching, depth encoding and reverse current encoding circuits of FIG. 3, respectively;

FIGS. 7a, 7b, 7c and 7d are waveform diagrams illustrating the output of various parts of the system of FIG. 3 during the polarization, collection, recording and encoding steps of the logging system of the present invention.

DETAILED DESCRIPTION OF SPECIFIC EMBODIMENTS

Figure 2:
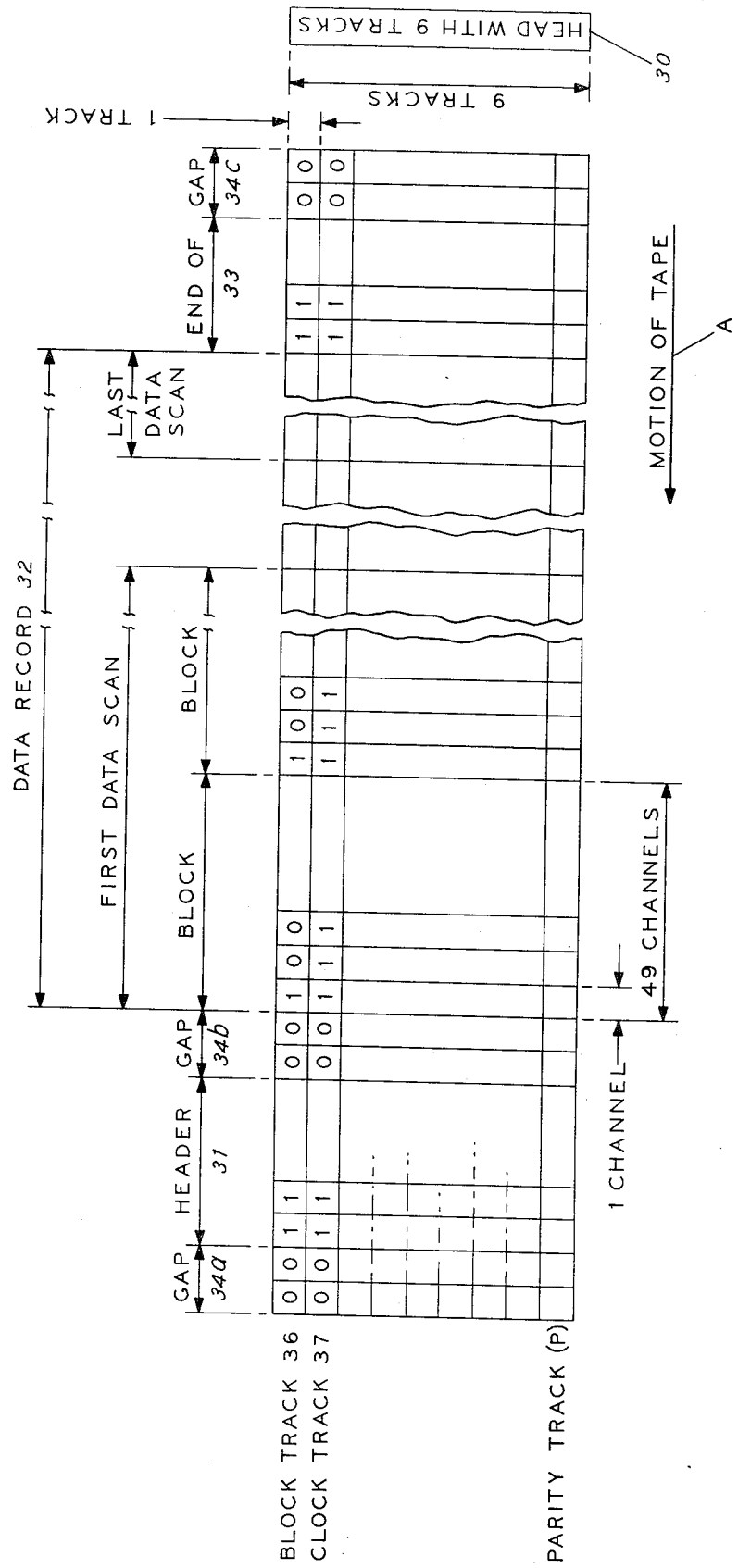
FIG. 2 is a representation of the position of binary information on magnetic tape as carried out by the nuclear magnetism logging system of FIG. 1.

Attention is now directed to FIG. 1 illustrating the method of the present invention. As there seen, nuclear magnetism well logging measurements can be made on an earth formation 10 lying along a well bore 11. In the performance of this invention, a non-magnetic logging sonde 12 is brought adjacent to the earth formation 10. The sonde 12 contains a polarizing coil 13 and a plurality of receiving coils 14. Travel of the sonde 12 is controlled by a cable 15 attached to a cable drum (not shown) through a depth indicating sheave 16. The cable 15 includes a plurality of conductors, 17a, 17b, 18a, 18b, 18c, and 18d, connecting the polarizing coil 13 and receiving coil 14 to a digital logging system 20 (including a polarizing supply 21) through switch circuit 22, and reverse current encoder encoder 24 is seen to be operatively connected between sheave 16 and digital logging system 20.

Before describing the relationship of the switch circuit 22, and encoders 23 and 24 with respect to the digital logging system 20, a brief discussion of the advantages of utilizing an array of receiving coils 14 within the nuclear magnetic logging sonde 12 may be in order.

In my U.S. Pat. No. 3,402,343 for "High Speed, High Resolution Nuclear Magnetism Well Logging Apparatus Having a Plurality of Receiving Coils and an Extended Polarizing Coil, and Method Using Same," an array of multiple receiving coils are used in conjunction with a single elongated polarizing coil. The effect of using the array of receiving coils is to improve resolution of the final nuclear magnetic logging record. As explained in that patent, the nuclear magnetic signal induced into each receiving coil is directly related to a given depth interval equal to the vertical extent of the receiving coil. When the nuclear magnetic signals are serially recorded as taught in the above identified patent, the resulting record has relatively high resolution. For these reasons and similar purposes, the logging sonde 12 can be provided with a plurality of receiving coils 14 such as receiving coils 14a and 14b of FIG. 1. The recording of A.C. signals induced into each of the receiving coils 14a and 14b is not, however, in an analog representation, but is in binary format so as to be compatible with processing by modern computer processes. As taught in my previous patents, consider that the array of receiving coils 14a and 14b produces, at each logging station, sets of data each of which has to be recorded as a function of depth. That such data must be amplified, multiplex, analog digitally converted and then recorded as a function of depth on a time with later processing by digital computer, is well known. Since the computer basically manipulates and processes data based on character length divided into "words" and "blocks," the tape format of the present invention is likewise organized.

In FIG. 2, for example, a nine-track magnetic tape format produced by the DLS 20 of FIG. 1 is seen to be arranged in a series of tracks positioned across the width of the tape, and in a plurality of channels arranged along the length of the tape. Motion of the tape is in the direction of arrow A. Transfer of data to the tape is accomplished by a nine track head unit 30 positioned at right side of FIG. 2. Indications of specific sections of data along the longitudinal length of tape divide each record into a header section 31, a data record section 32 and an end of record section 33. In the data record section 32, the data is further organized into a series of data sections as indicated.

For example, along the width of the seris of tracks there is included the following: three control tracks and six data tracks. The six data tracks are utilized, numbered 0, 1, 2, 3, 4, and 5, 6, and 7, in conjunction with the block and clock tracks to form a group of 8-bit characters which is called a byte. Thereafter two of the bytes can be recorded as a digital word. Block and clock tracks 36 and 37 are used to record block pulses and clock pulses respectively. A block pulse is generated at the dividing point between two data blocks and thus distinguishes the data blocks which follow. The block pulses are recorded by continuously magnetising the block track 36 in one direction. To establish the ONE state, the block track 36 is magnetized continuously at the start of the record, and at each block address word. Where data words are inserted into the record after the block address, no pulses are recorded within the block track 36 (ZERO state). A clock pulse is generated at clock track 37 at each channel for all data words. Where a gap appears in the records, say at gaps 34a, 34b and 34c, the data bits on block track 36 and clock track 37 are in the zero state. The start of each block of data, except for the zero block address (remaining channel tracks are in the zero state) the address is signified by means of $2^0$ to $2^6$ orders of binary bits which appear in the remaining six data channels. Parity track (P) is used to record a parity pulse which serves as a check of the efficiency of the transfer of the data onto the magnetic tape. All information within one data channel should add up to either an odd or an even number which should be checked with the parity signal provided within each parity track (P). For example, if the data tracks 0, 1, 2, 3, 4, and 5 are used, then a parity pulse ONE would appear if these data tracks contain an even number of ones.

Of course, other error-finding processes, in addition to single parity, are available to check for errors including e.g. double parity, constant ratio (2 out of 5 coding), and one of the most important, cyclic coding. Since many of today's systems use a yclic error-control code, because of the advantages of being simple to implement and effective in detecting burst errors, it will now be discussed in detail.

A code is said to be "cyclic" if it has the following properties: All words have the same length, $n$. Each word consists of $k$ data bits followed by $n-k$ check bits. If a word $(x1, X2 \ldots x_n)$ is in the code set, so is the word $(x_n, x_1, x_2, \ldots x_n-1)$. Without going into detailed explanation, cyclic codes are generated as follows:

i. The $k$ data bits are used to construct a binary polynominal, $G(x)$, with the bits becoming the coefficients in $G(x)$,
ii. $G(x)$ is multiplied by $x^n{}^{-k}$,
iii. The product of $G(x) \times x^{n-k}$ is divided by a generating polynominal,
iv. The remainder of the division of (iii) is added to the data bits to comprise the complete multi-bit message; the remainder bits being the cyclic code check bits.

Inexpensive hardware can be used to generate the cyclic codes; e.g., the check bits (from the binary polynominal division) can be generated by simply moving the data bits through shift register. Detection of errors in the message is equally simple. Data bits are passed through a shift register at say, an off-site computing certer remote from the logging site. If the remainder which is generated matches the check bits received with the message, there are no errors. If the check bits don't check the remainder, there is an error. If an error is found, a procedure may be insituted to attempt automatic correction.

Gaps 34a, 34b and 34c of the tape of FIG. 2 have previously been indicated by means of zero state in the block and clock tracks 36 and 37 for all channels comprised in the gap. Gap 34b is seen to be positioned between the header section 31 and the data record section 32. Within the data record section 32, each channel is divided into an eight-bit byte and one parity channel (P). Carried within each byte, six channels are available for data. Since it is desirable that 12 orders of binary information be available for each sample nuclear magnetic signal, two adjacent bytes can effectively comprise one digital data word. The number of blocks required to provide a logging data record varies with the amount of fixed information that is to be provided, as well as the duration of the nuclear magnetic signal and the error checking method utilized. For example, a one-second analog nuclear magnetic signal received at the receiving coils 14a and 14b of FIG. 1 and sampled at 0.002-second intervals, digitized and then recorded will require (1/.002) 500 blocks of data per coil. The data of the dual coils 14a and 14b is usually located within adjacent paired data channels in the most significant 12-bit positions (digital word).

Since the functions of the nuclear magnetism logging system of the present invention are most easily divided into operating cycles related to (i) digitizing and recording of nuclear magnetic signals and (ii) controlling the reverse current amplitude and depth, the system of the present invention will now be discussed with relation to these functions.

DIGITIZING OF NUCLEAR NAGNETIC SIGNALS AT DEPTH

Figure 3:
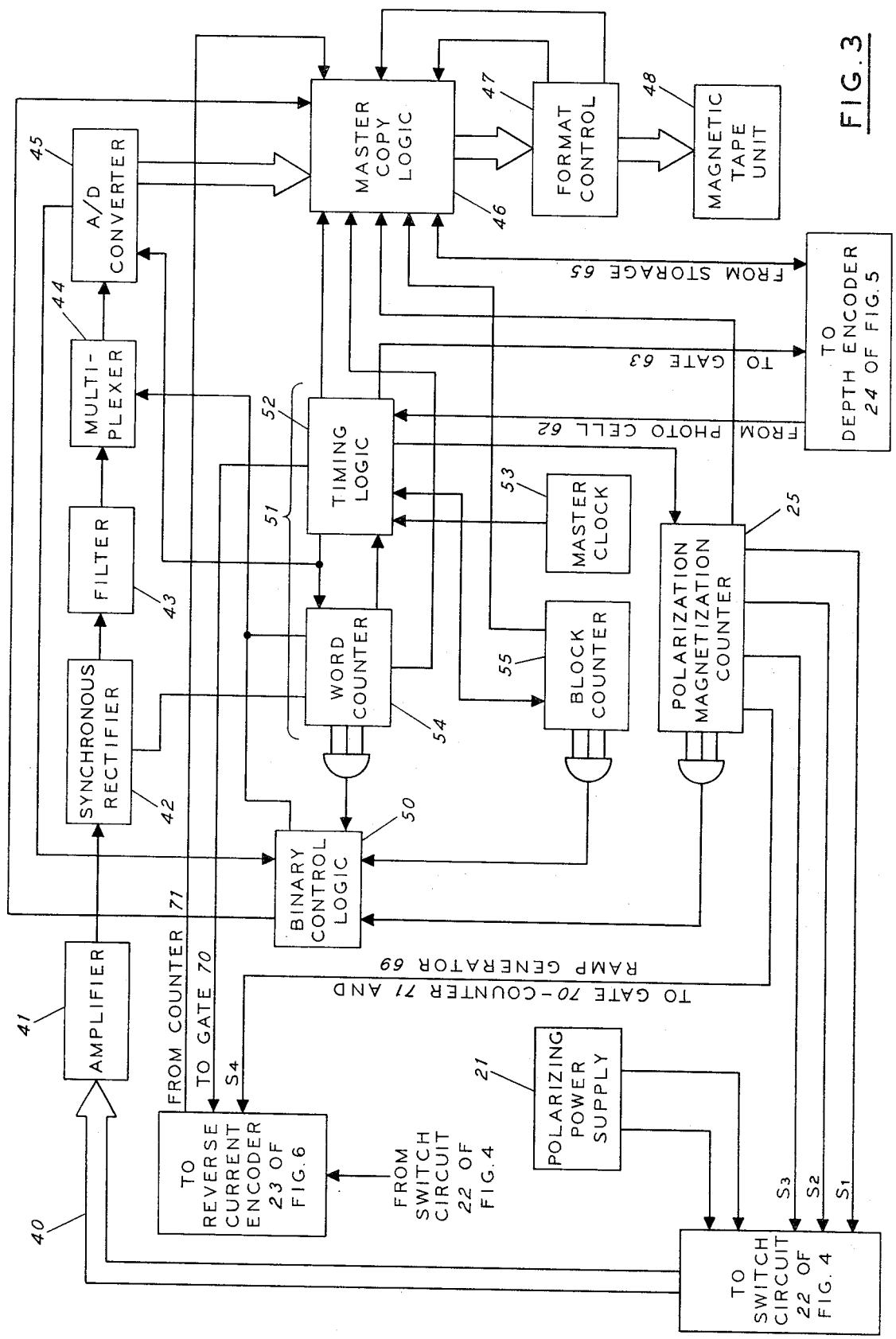
FIG. 3 illustrates the nuclear magnetism logging system of FIG. 1 in more detail.

As shown in FIG. 3, the output from the receiving coils 14a and 14b enter the digital logging system 20 via conductor means 40, thence through amplifiers 41, synchronous rectifier 42, filter 43, multiplexer 44, antilog-to-digital converter 45, master copy logic circuit 46, format control circuit 47 and finally to magnetic tape unit 48. To provide word lengths and block lengths of data that are compatible with computer processing techniques, logic circuits 46 and 50 are carefully controlled for correct sequential operations utilizing a timer circuit generally indicated at 51.

As indicated, timing circuit 51 includes a timing logic circuit 52 controlled by a master clock 53 and produces a series of timing (clock) pulses which are applied to logic circuits 46 and 50 through word counter 54 and block counter 55. The word and block counters 54 and 55 dictate, in conjunction with timing circuit 51 when the other groups of circuit elements must perform a preselected function. Whole operations are preferably performed in synchronism with clock pulses (synchronous control). Each operation requires a certain number of clock pulses and, consequently, the timing to complete any one of the various operations is an exact multiple of the clock pulse. Thus the readout of copy logic circuit 46 to magnetic tape unit 48 is accomplished at specific intervals of time that are exact multiples of the clock pulses.

Since the various operations of the nuclear magnetism system of FIG. 1 are based upon the nature of the data obtained within the borehole, a general discussion of the nature of nuclear magnetism signal derivation may be instructive.

Since, the earth's magnetic field ($H_e$) is usually employed as an external magnetic field about which protons precess, as the polarizing field ($Hp$) is impressed on a section of earth formation, the protons tend to become aligned with a resultant magnetic field ($H_r$) which is the resultant magnetic field between the polarizing field and the earth's field. The preponderance of nuclear magnetic moments aligned with the field $H_r$ gives rise to a change in magnitude of the macroscopic moment of the protons. The process of changing the macroscopic moment from the direction along the axis of the magnetic field $H_e$ to a direction along the axis of the magnetic field $H_r$ is given by the equation $$M = M_o(1-e^{-t/T_1}) + M_e$$

where $M$ is the macroscopic moment vector in the direction of the axis of the resultant magnetic field $Hr$;

$M_o$ equals a known vector equals $X(H_r - H_e)$;

$t$ equals time;

$M_e$ is equal to the vector component of the macroscopic moment in the direction of the earth's field;

$T_1$ equals thermal relaxation time;

and X is the nuclear magnetic susceptibility of the interstitial fluids in the formation surrounding the bore hole.

When the polarizing field is removed, the macrscopic moment tends to align itself with the earth's field and thus be reduced to its original value. If the polarizing field is removed quickly enough (in the time short compared to $1/\omega_L$, where $\omega_L$ is Larmor frequency of a proton in the earth's magnetic field), then the macroscopic moment will precess above the earth's field.

Detection coils 14a and 14b in the vicinity of the samples are capable of detecting the precession of the macroscopic moment. The signal received by the pick up coils oscillates around zero amplitude (at around 2.2 KHertz) in positive and negative directions. Thereafter the signals are amplified by amplifiers 41 and undergo synchronous rectification at rectifier 42. Synchronous rectification yields the cosine and sine constituents of the signals and thus provides a means of truly recording the amplitude of the desired signal since the relationship between polarizing time and the resulting signal amplitude of the sine and cosine constituents for any given sample is a well-known exponential function:

$$A = A_m e^{-t/T_2*}$$

$A$ is a signal amplitude as a function of time;

$A_m$ denotes he maximum signal amplitude to be observed;

$T_2^*$ is the measurable signal decay time constant; and $t$ equals time.

The signal decay time constant $T_2^*$ depends both on the thermal relaxation time $T_1$ and the spin-spin relaxation time $T_2^*$. However the spin-spin relaxation time $T_2$ is difficult to measure and for purposes of interpretation of nuclear magntiude signals, the signal decay time constant $T_2^*$ of the above equation is one of the several parameters nearly always measured in the field.

The rectified sine and cosine constituents are then sent in sequence through filter 43 to multiplexer 44. At multiplexer 44 the amplitude of both sine and consine constituent signals are sampled, in sequence, over a plurality of very small time intervals and then are transferred to analog to digital converter 45 where the digital results of the multiplexing operation are represented as a series of multi-bit binary code indications. The binary code information is electrically suited for storage onto magnetic tape at magnetic tape unit 48 on adjacent paired channels.

Analog-to-digital converter 45, and magnetic tape unit 48 are selected from among several commercially available. Since converter 45 changes an analog representation of a variable (like signal amplitude) into a digital or binary representation of that same variable, the different ways in which this A/D conversion can occur are many-fold, (e.g, successive approximation, circulation, etc.). Such operations, i.e., the electrical operation of converting an analog value to a digital value, should be recalled as being similar to the mechanical operation of weighing using a balance. Groups of bits with known values are added, subtracted or replaced until their total value "balances" the voltage being "weighed" (or converted).

Conventional A/D converters can perform the "weighing operation" very fast (80,000 12-bit conversions/sec); hence only one A/D converter is needed per nuclear logging system. Each analog value can be switched through the A/D converter with essentially no time delay.

At the off-site computing center, the results recorded at magnetic tape unit 48 can be plotted, say on semilogarithmic graph paper, so as to indicate the relaxation time constant. Other methods for indicating relaxation time are also available: (1) the rectified signals can be integrated over some interval time to indicate the constant, or (2) computer circuitry can be used directly to subtract the signal amplitudes at the appropriate times, say corresponding to time equals infinity and zero and normalizing by dividing the signal for time equal zero in order to obtain directly relaxation curves as an output. Thermal relaxation time is then determined by determining the time corresponding to a value of $1/e$ (0.37).

Although the system of the present invention as has been described, controls the multiplexing and conversion of analog data to digital data as well as providing data in correct time sequences, additional circuitry can be inserted and combined with the system hereinbefore described to provide additional data processing features if desired. For example, not only could the data be moved and encoded in correct digital format onto magnetic tape, but other statistical functions could be performed on the data prior to its recordation, if desired.

POLARIZATION, INCLUDING DEPTH AND INVERSE CURRENT ENCODING

In addition to controlling the digitizing the detected nuclear magnetic signals, clock pulses from the timing circuit 51 of the logging system of FIG. 3, are also used to control operation of depth encoder 24 and polarization timing magnetization counter 25. Although all polarizing activity is paced by signals from master timing logic circuit 52 of timing circuit 51 it is preferable that amplifiers 41, synchronous rectifier 42, multiplexer 44, analog-to-digital converter 45 remain in an active state during the polarization sequence. Generally, during the polarization, the depth encoder 24 and timing counter 25 are used to initialize operations and then generate a series of enabling signals indicated as $S_1$, $S_2$, and $S_3$ to switch circuit 22 as well as signal $S_4$ to reverse current encoder 23, based on timing pulses supplied by way of logic circuit 52 and master clock 53. Operatively connected to the timing counter 25 is binary control logic 50 in order to synchronize encoding of the reverse current by master copy logic 46 in cooperation with magnetic tape unit 48. Depth encoder 24 interconnects between master copy logic 46 and timing logic circuit 52, while counter 25 is connected between the timing logic circuit 52, switch circuit 22, reverse encoder 23 and master copy logic circuit 46. The depth encoder 24 and polarization counter 25 (including switch circuit 22 and reverse current encoder 23) will now be discussed in detail.

DEPTH ENCODER 24

When the sonde arrives at a given logging location within the borehole, the depth of the station must be recorded, say at the header section of the tape at tape unit 48 of FIG. 3. The synchronization of the encoding is checked by logic timing circuit 52. At the occurrence of a selected blank and word pulse depth encoder 24 can be sequentially operated so that depth data—in binary format—can be gated through master copy logic circuit 46 for recording at magnetic tape unit 48 prior to the polarization and recording cycles. With special reference to FIG. 5, pulse depth encoding circuit 24 is seen to include a typical digitation unit 59 common to the logging art. As seen, a coding disc 60 is disposed to rotate in accordance with the movement of the logging sonde with the borehole. The disc 60 has a plurality of timing slots (not shown) formed at suitable locations as near the outer periphery thereof. A suitable light source 61 situated on one side of the disc 60 and a plurality of photo cells 62 are situated on the other side of the disc 60. The disc 60 thus can provide suitable timing pulses to enable the timing logic circuit 52 at appropriate moments, inter alia: (i) to initialize control and logic circuits within the logging system using start and reset signals and (ii) to indicate that a digital pulse signal indicative of depth has been generated. As shown, photocells 62 also provide a timing (enabling) signal to a gate 63 interconnected between a digital comparator 64 and timing logic circuit 52. The digital output from the photo cells to take the form of a continuously changing digital signal which enters digital comparator 64 directly as well as through delay circuit 66 and which is also stored at storage unit 65. The ramp can utilize any desirable code as the binary code to correspond with the coding utilized in the master copy logic circuit 46. Additionally, other types of coded discs can be utilized such as a magnetic disc or drum type of disc. When the digital ramp functions which are applied to the digital comparator 64 are equal, the comparator provides a signal to the gate 63. The comparator 64 is of conventional design and can include a plurality of AND gates connected to associated register means. As the AND gates are energized (indicating equalization), the gate 63 is enabled which in turn enables the storage unit 65 so as to input the digital depth indication information to the master copy logic unit 46.

Now, before discussing the reversal of the polarization by counter 25 in cooperation with switch means 22 as well as the encoding aspects of encoder 23, the reason for current reversal during polarization will now be discussed.

As mentioned with relation to FIG. 1, direct current flow to the polarizing coil 13 during operations is always by way of power supply 21 through switch circuit 22. The duration of the polarizing cycle, i.e., the polarizing period, is at least as long as the relaxation times expected of the formation proton. Of course, if there is magnetite in the earth formation, the magentization produced by such particles must be reduced prior to the establishment of the polarizing field irrespective of the polarizing time selected for operations so that that residual field (due to the magnetization of the mineral grains) will be sufficinetly weak and not interfere with the later produced proton processional field. The magnitude of the polarizing field is a relatively weak one (in the order of a few hundreds of Gauss, say in a range of 200 Gauss). Since the presence of magnetite may have a sufficiently greater effect at such magnitudes, magnetite-induced interference with the precession of the protons about the earth's magnetic field, is of concern. However, by reversal of the polarizing current prior to applying current in the usual forward mode, I find that the resulting nuclear magnetism signals are of adequate duration and amplitude even in the presence of magnetic materials in the earth.

To illustrate how reversal of the polarizing current as well as encoding of the reverse current flow onto magnetic tape at the header section by means of polarization counter 25 are achieved, reference should now be made to FIGS. 3, 4 and 6.

POLARIZATION COUNTER 25

As shown in FIG. 3 polarization timing counter 25 is interconnected between the timing logic circuit 52 and (i) switch circuit 22; (ii) encoder 23; (iii) binary control logic 50; and (iv) master copy logic 46.

It usually includes a series of FF's which after initialization can be triggered and properly gated by means of the logic timing circuit 52 to generate the control signals $S_1$–$S_4$. Control knobs (not shown) allow the pulse width of these signals (duration) to be changed if conditions encountered in the field dictate. The counter, of course, also includes means for accumulating clock pulses which after a selected number have been accumulated, provide the control signals $S_1$–$S_3$ in proper sequence for switch circuit 22 and control signal $S_4$ for current encoder 23.

Control signals $S_1$–$S_3$ at switch circuit 22 are shown in detail in FIG. 4. Consider that the signals $S_1$–$S_3$ separately operate relay 26a, 26b, and 26c, respectively; in more detail relay 26a is enabled by signal $S_1$ so as to operate ganged contacts 27a, 27b, 27c and 27d of switch 27 which interrupt (disenable) the receiving coils with respect to the system during the detection cycle and which interconnect (enable) the coils during the detection cycle. Relays 26b and 26c are both enabled at the same time by signals $S_2$ and $S_3$. These signals however, have different pulse widths equal to $P_2$ and $P_3$, respectively, where $P_2 > P_3$, the significance of which will be discussed later with reference to FIGS. 7a–7d.

Contacts 28a and 28b of switch 28 disconnectably connect the power supply 21 of the logging system to the downhole polarizing coil in either one of two (ON-OFF) modes: (i) Mode I (ON) occurs when the contacts 28a and 28b of switch 28 assume positions shown in phantom line in FIG. 4 and (ii) Mode II (OFF) occurs when the contacts 28a and 28b are positioned as shown in solid line in FIG. 4. Relay 26c operates only during Mode I of switch 28: at the start of the polarizing coil activation, relay 26c is enabled so that contacts 29a and 29b of switch 29 assume the positions shown in phantom line (FIG. 4) to allow current to flow to the polarizing coil in a reverse direction. When the relay 26c is disabled, the contacts 29a and 29b assume the positions shown in solid line to allow flow current in the forward direction to the coil. During "reverse" operation of the contacts 29a and 29b of switch 29, potentiometer 35 can be seen to be able to generate a signal indicative of the amplitude of the reverse current gated to reverse current encoder 23 of FIG. 6.

CURRENT ENCODER 23

As shown in FIG. 6, encoder 23 includes a comparator circuit 68 operating in conjunction with function generator 69 to determine the magnitude in binary format of the current at potentiometer 35.

In performing of analog-to-digital conversion of the reverse current, the encoder 23 utilizes a comparison method wherein a locally-generated sawtoothed (ramp) voltage from function generator 69 is compared with the voltage provided by the potentiameter 35. The comparator 68 is of conventional design Since the potentiameter 35 has been preset (to provide analog values within a selected range) the comparitor 68 iss assured of operation in the correct voltage range of the generator 69. Each voltage level is also considered to have a specific "analog equivalent or numbers" assigned to a particular voltage level.

In FIG. 6, two inputs are seen to be applied to comparator 68: (1) the analog voltage input from the potentiometer 35 and (ii) the linear ramp voltage from the generator 69. The ramp generator output is initiated each time a start signal is applied from the timing circuit 52 of the digital logging system. The start signal also applies to gate circuits 70 as well as resets counter 71. As long as the analog and ramp generator inputs to the comparator differ in magnitude, the clock pulses from timing circuit 52 are permitted to transmit through the gate 70 to the counter 71. When two inputs to the comparator become equal, the comparator will generate the stop signal which disables the gate circuit 70. The disabled gate circuit 70 blocks the flow of pulses to the counter 71. The number of pulses accumulated in the counter during the comparison time interval is proportional to the amplitude of the reverse current and can be gated to the magnetic master tape logic circuit 46 for inclusion on the header section of the magnetic tape.

Figure 8:
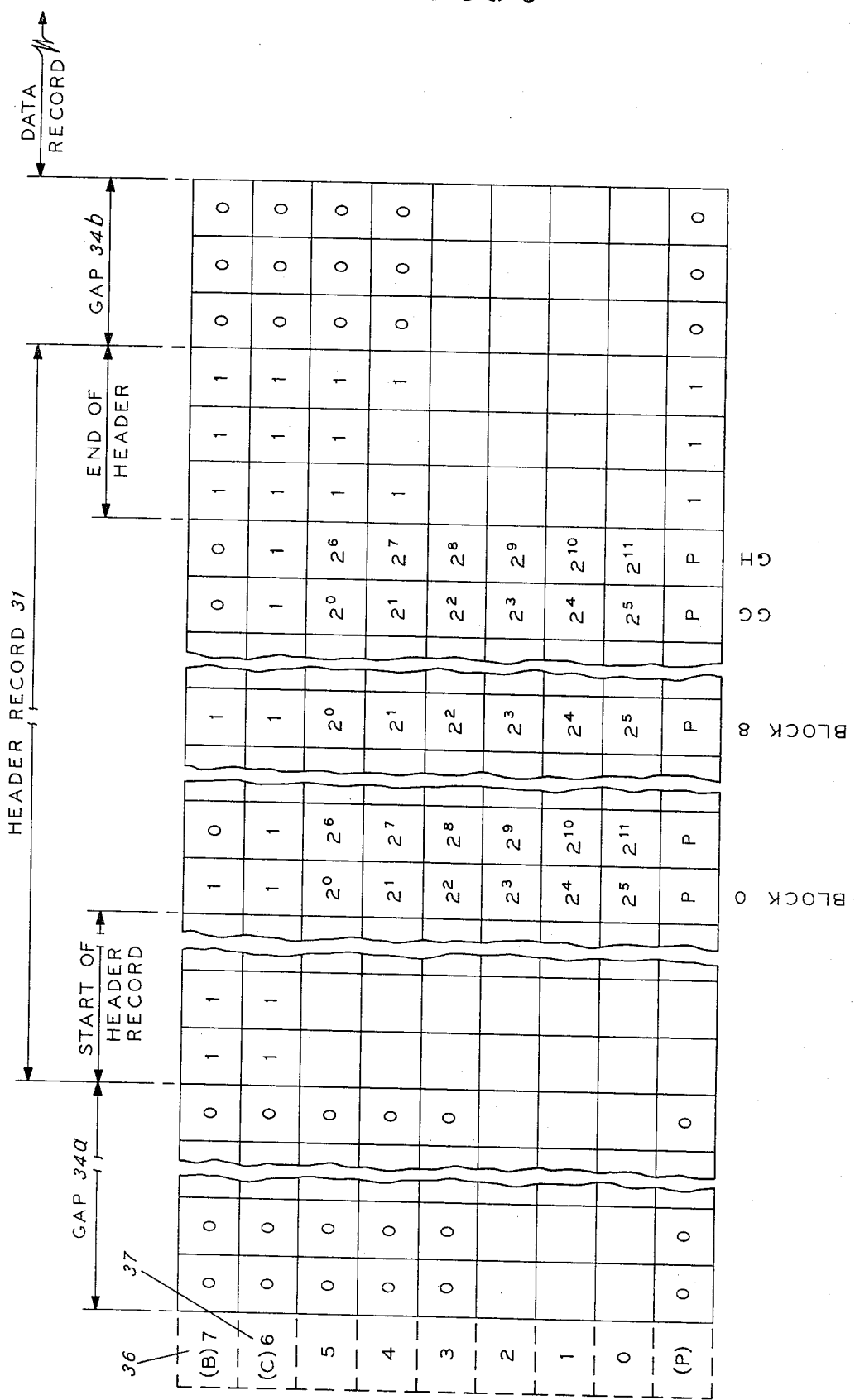
FIG. 8 is a schematic representation of the positioning of reverse current information onto magnetic tape in accordance with the reverse current encoding system of FIG. 6.

Timing required to bring about inclusion of the information in the correct sequence of course depends upon the block and word counters 54 and 55 of the digital logging system after recording at the tape unit 48, the date has the format illustrated with reference to FIG. 8, and is seen to be sandwiched between gaps sections 34a and 34b in header section 31. Along the lefthand side as viewed in the figure, are tracks 0, 1, 2, 3, 4, 5, 6, and 7, as well as parity track (P). At the header section 31 block track 36 and clock track 37 are coded with "ONES" stored as shown. Within the remaining data blocks various logging information can be inserted in alphanumeric form. Beginning with a selected block address, various well site as well as other geographic information can be inserted and recorded. Following geographic information, the reverse current information can be coded in binary form. For this, there is set aside two blocks of data to indicate the magnitude of the reverse current: channels GG and GH. At channels GG and GH (channels GG and GH and identified with particular word and block numbers on the header record section) a two byte, 12-bit code is used to record current amplitude.

METHOD OPERATIONS

To better understand the sequence of steps for carrying out the present invention, reference should be made to FIGS. 7a – 7d showing signal waveforms produced by the various circuit elements of the nuclear magnetism logging system of FIG. 1.

FIGS. 7a and 7b: starting at time = 0, switch contacts 29a, 29b of switch 29 are in its normal bias position (solid line in FIG. 4) while contacts 28a and 28b of switch 28 are in the "OFF" position (solid line in FIG. 4). When relays 26b and 26c are activated simultaneously by means of signals $S_2$ and $S_3$ (FIG. 7b) activating the switches 28 and 29 (time = $T_1$), a reverse polarizing period for the earth formation is generated In more detail, switch 29 is placed in reverse bias operating position relative to the power supply while switch 28 is placed in its "ON" mode, so as that current flows in reverse flow through the polarizing coil located downhole adjacent to the earth formation to be polarized.

After the reverse polarizing period has ended (that period is of course equal to the pulse width $P_3$ of signal $S_3^3$), the relay 26c is deactivated, and switch 29 reverts to its normal bias position. But the switch 28 remains in its "ON" mode since signal $S_2$ has not terminated at time = $T_2$. Current flow in the forward normalized polarizing mode passes then through the polarizing coil and polarizes the adjacent formation protons. Current flow is continuous until the signal $S_2$ is terminated at time = $T_3$ which terminates the polarizing period.

It is apparent that pulse width $P_2$ of the signal $S_2$ is greater than the normal polarizing period for the formation protons since the signal $S_2$ is operative over both the reverse and normal polarizing periods of the logging operations.

The pulse width $P_2$ is related to the inverse and normal polarizing periods in accordance with the following equation:

Total Polarizing Period = Reverse Polarizing Period − Normal Polarizing Period.

FIG. 7c; The polarizing field is zero at $T_o$: shortly after $t = T_1$, the field is equal to $(-H_p)$: it goes to zero shortly after $t = T_2$ on its way (linearly) to a magnitude of $(+H_o)$, it terminates at $t = T_3$. During the reverse polarizing period, the magnitude of the reverse field strength can vary. In some situations the magnitude of reverse field might be a number times the normal field strength $(H_p)$ other than zero. For example, cardinal numbers 1, 2, 3, 4 times the normal $H_p$ could be utilized to produce reverse fields equal to $(-H_p)$; $(-2H_p)$;

($-3H_p$); ($-4H_p$); etc. Furthermore, fractional numbers of less than one may also be utilized in some cases say where magnetite formation is not severe.

FIG. 7d: As the termination of signal $S_2(t = T_3)$, the detection coils are not immediately placed in contact with the uphole logging circuitry, but remain in an inactive state. This is seen by comparing FIG. 7b with FIG. 7d. Note that the trailing edge of the pulse $S_2$ is not coincidental with the leading edge of the pulse $S_1$. The resulting "wait" period, ($T_4-T_3$), is necessary to allow transcient signals to become dampened; at time = $T_4$, the signal $S_1$ is generated, activating the switch 27 and connecting the receiving coils to the uphole circuitry. Over the pulse width $P_1$ of the signal $S_1$, the precessing protons reach a relaxed state; then the signal $S_1$ is terminated (time = $T_5$). Thereafter, the logging operations can be repeated, the logging sonde remaining at the same logging station. Normally, however, the sonde is moved to a new logging station and logging operations, as previously described, are repeated.

It should be apparent to those skilled in the art that the timing control signals for carrying out the logging operations must be flexible enough to allow for change circumstances in this field, e.g., the rate at which the data are digitized may be required to be changed after the system is in the field. This can be easily done by resetting of the various counters. It can be appreciated that since all logic for operation of the system is derived from the digital logging system circuitry, changes in reverse and normal polarizing periods and wait periods, as well as detection periods, can likewise be changed in the field.

Typical polarization durations which have been found satisfactory in this regard are 6, 5, 4, 3, 2, 1.5, 1, .8, .6, 0.4, 0.3, and 0.2 seconds. Typical wait periods are variable but usually range about 30 milliseconds after which the amplitude of the nuclear precssion signals are measured. The thermal relaxation times determined by the time corresponding to values for build-up to $1-1/e$ where ($1-1/e$) is equal to 0.63, range as follows: oil and gas can range from a few ms to several seconds in duration.

Although the thermal relaxation times are usually over 100 milliseconds, the signal decay times, $T_2^=$, are usually much shorter because of the effect of the magnetic particles in the formations. When $T_2^=$ is comparable to the wait period, it is difficult to observe NML signals at all. Even when $T_2^=$ is substantially longer, it is advantageous to increase it if possible in order to permit observation of the signal for the longest possible length of time and after the minimum amount of signal decay. The present invention has had success throughout the range of $T_2^=$, often increasing $T_2^=$ by 20 percent or more.

It should be noted that the magnetic field strength (negative and positive) are not abruptly changed because of the internal inductance of the polarizing coil. Specifically, after the control signals $S_2$ and $S_3$ are terminated, the period for continued current flow is of course determined by the time constants of the LRC circuit formed by the coil and other circuit elements therein. In this regard a coil length of 3 feet and width of 6 inches, having 720 turns, of 18 wire, has been found to be satisfactory in this regard.

As previously mentioned, the magnitude of the reverse magnetic field can range from fractions of the normal polarizing field $H_p$ to values which are greater than the usual field stength ($H_p$). Table I illustrates various reverse magnetic strengths at the edge of the borehole which can be utilized in accordance with the method of the present invention along with the expected reverse polarizing period for a polarizing coil of 3 feet placed in a well bore.

TABLE I

| Inverse Polarizing Field | Inverse Polarizing Period, (millisec) |
|---|---|
| 20 | 4 |
| 80 | 16 |
| 100 | 20 |
| 150 | 30 |
| 200 | 40 |
| 250 | 50 |

Thermal relaxation times on samples obtained from subsurface earth formations shown dramatic improvement when using the method of the present invention, even though the samples contained measurable traces of magnetite. The following measurements set forth in Table II have been obtained from core samples taken from wells located in the Red Wash region of Wyoming which indicate that signal decay times ($T_2^=$) can be substantially increased by the method of the present invention.

TABLE II

| | Without Reverse Polarization $T_2^=$(MS) | With Reverse Polarization $T_2^=$(MS) |
|---|---|---|
| Sample 1 Red Wash Region Well 1 | 60 | 70 |
| Sample 2 Red Wash Region Well 2 | 42 | 51 |
| Sample 3 Red Wash Region Well 3 | 55 | 64 |

It should be pointed out that the nature of the porous media under investigation directly influences the relaxation rate as discussed in my U.S. Pat. No. 3,213,356 for "Method for Investigating the Properties of Fluid (Materials) Within Porous Media." As pointed out in my above noted patent, in making measurements, two things are usually determined: (1) the number of protons in the fluid phase and (2) the relaxation rate or relaxation time.

It is also known that a sample may be composed substantially of two components of unknown relaxation rates and there are several ways of determining the separate components experimentally; (i) if the two relaxation rate differ by a larger factor, the components can be easily separated, (ii) if the relaxation rates differ by only a small factor, the determination requires relaxation data from measurements with good signal to noise ratio.

The present invention has contemplated usage in conjunction with the methods described and claimed in the above patent. Various other modifications and changes will occur to those skilled in the art, and such changes can be made without departing from the scope of the present invention as set forth in the appended claims. Such modifications are intended to become within the scope of these claims.

I claim:

1. In the method of identifying in an earth formation traversed by a well bore, nuclear magnetism signals indicative of a characteristic of said earth formation by (i) positioning a polarizing coil in said well bore adjacent said formation, (ii) applying a magnetic polarizing field of magnitude ($H_p$) to a portion of said formation by flowing a direct current in a forward direct current biasing mode through said polarizing coil for a preselected polarizing cycle and then (iii) after interruption of said forward current biasing mode, detecting said nuclear magnetism signals due to inphase precession of protons in said earth formation under the influence of the earth's magnetic field over a preselected detection cycle, the improvement for reducing the effect of magnetic materials in said formation on said nuclear magnetism signals which comprises a substep occurring after step (i) but before step (ii), of flowing direct current to said polarizing coil in a reverse direct current biasing mode to generate a reverse polarizing field in said earth formation of a preselected magnitude and after said preselected reverse polarizing field has been attained, then reversing the amplitude of said reverse current flow to zero.

2. The improvement of claim 1 in which said attained preselected reverse polarizing field is equal to ($-KH'_p$) and is related to said magnetic polarizing field ($H_p$) of step (ii) in accordance with $(-H'_p) = K'(+H_p)$ where K and K' are members of a set of all positive numbers.

3. The improvement of claim 2 where K is equal to 1.

4. The method of reducing the effect of magnetic materials in an earth formation traversed by a well bore on nuclear magnetism signals to permit easy identification of a characteristic of said earth formation derived from said nuclear magnetism signals, which comprises steps of (i) positioning of polarizing coil in said well bore adjacent to said formation containing said magnetic materials, (ii) flowing direct current to said polarizing coil in a reverse current biasing mode to generate a reverse polarizing field in said earth formation, (iii) after a preselected reverse polarizing field of magnitude ($-KH_p$) has been attained, where K is a member of a set of all positive numbers, then quickly reversing the amplitude of the said reverse current flow to zero, (iv) applying a positive magnetic polarizing field of magnitude ($H_p$) to a portion of said formation by flowing a direct current in a forward current biasing mode opposite to said reverse direct current flow to said polarizing coil for a preselected polarizing cycle, (v) after interruption of said direct current in said forward current biasing mode, detecting sudden nuclear magnetism signals due to inphase precession of protons in said earth formation over a preselected detection cycle under the influence of the earth's magnetic field so as to indicate said characteristic of said earth formation.

5. The method of reducing the effect of magnetic materials in an earth formation traversed by a well bore on nuclear magnetism signals to permit easier identification of a characteristic thereof, which comprises the steps of (i) positioning of polarizing coil in said well bore adjacent said formation containing said magnetic material, (ii) flowing direct current to said polarizing coil in a reverse direct current biasing mode in accordance with a digital time source code so as to generate a reverse polarizing field of magnitude ($-KH_p$) in said earth formation, where K is a member of a set of all positive numbers, (iii) after said preselected reverse polarizing field of magnitude ($-kH_p$) has been attained, then reversing, in accordance with said digital time source code, the amplitude of said reverse current flow to zero, (iv) applying also in accordance with said digital time source code, a positive magnetic polarizing field of magnitude ($H_p$) to a portion of said formation by flowing through said polarizing coil a direct current in a forward current biasing mode for an interval of time determined in accordance with said digital time source code, (v) interrupting said forward direct current in said forward direct current biasing mode, (vi) then detecting said nuclear magnetic signals over a detection cycle determined in accordance with said digital time source code in said earth formation under the influence of the earth's magnetic field, digitally recording in accordance with said digital time source code said detected nuclear magnetism signals, said signals being improved by the reduction of the effect of magnetic materials in said formation so as to allow more accurate identification of said characteristic of said earth formation.

6. The method of claim 5 in which said digital time source code in the steps (ii) through step (vi) constitutes the digital signals representative of multibit digital timing words and a plurality of clock pulses cooperatively functioning to provide sequential control of said indicated process steps (ii) through (vi).

7. The method of claim 5 wherein step (i) is further characterized by the sub-step of generating a multi-bit digital code indicative of the depth of said polarizing coil within said well bore.

8. The method of claim 5 wherein step (iii) is further characterized by the sub-step of generating a multi-bit digital code indicative of the amplitude of direct current in said polarixing coil during said reverse direct current biasing mode.

9. The method of claim 8 in which said multibit digital code indicative of said amplitude of said direct current during said reverse current biasing mode in said polarizing coil, is recorded on magnetic tape in a 9-bit word.

10. A digitally controlled nuclear magnetism logging apparatus adapted to digitally reproduce nuclear magnetism signals induced by protons within an earth formation penetrated by a well bore precessing about the earth's magnetic field while simultaneously minimizing the effect of sources of magnetic field inhomogenieties within said earth formation as said precession occurs, comprising (i) a polarizing coil adapted to be positioned within said well bore at a selected depth (ii) means for detecting said nuclear magnetism signals in said earth formation due to the precession of protons of said formation under the influence of the earth's magnetic field over a preselected detection cycle, (iii) a digital logging system means operatively connected to said polarizing coil and said detecting means, said digital logging system including a direct current supply means disconnectably connected to said polarizing coil (iv) cooperative switch means disconnectably connected intermediate said polarizing coil and said direct current supply means of said digital logging system, (v) said digital logging system also including a digital signal generating and control means connected so as to control operation of said cooperative switching means in accordance with a digital time source code as to thereby provide a series of digital control signals for controlling the direction and time of occurrence of direct current flow between said polarizing coil and said direct current supply means, (vi) said cooperative switch means also including a reversing mode polarity switch means controlled by said digital generating and control means of said digital logging system adapted to be enabled so as to flow said current to said polarizing coil in a reverse direct current direct current biasing mode during a selected time increment determined by said digital time source code so as to generate a reverse polarizing field of magnitude ($KH_p$) in said earth formation prior to allowing current flow to said polarizing coil in a normal forward direct current biasing mode (vii) said cooperative switch means also including a two-state switch means in circuit with reverse mode switch means having an enabled state to allow flow of current in said forward direct current biasing mode to said polarizing coil to generate a magnetic polarizing field of magnitude ($H_p$) in said earth formation for preselected polarizing cycle measured by and in accordance with said digital time source code to thereby polarize said protons in said formation, said two-state switch means also causing interruption of said forward current flow after said polarizing cycle has been completed so as to cause said magnetic polarizing field ($H_p$) to fall to zero rapidly.

11. The apparatus of claim 10 wherein said two-2-state switch means is in circuit with said digital logging system so as to be under control of and operating in accordance with said digital source time code becoming enabled during said polarizing cycle to connects in circuit said polarizing coil and said direct urrent supply means during both said reverse and forward current biasing modes and then becoming disabled during said detection cycle whereby said nuclear magnetism signals are detected by said detecting means.

12. The apparatus of claim 11 wherein the digital logging system includes a digital recording means operatively connected and controlled by said generating and control means for recording said nuclear magnetism signals characteristic of said precessing protons in said earth formation on magnetic tape in a digital multibit format.

13. The apparatus of claim 12 with the addition of a reverse current digital encoder means in circuit with said cooperative switch means, said polarizing coil and said direct current supply means for generating a first multibit digital code indicative of the amplitude of said reverse current flowing to said polarizing coil during said reverse current biasing mode, said encoder means being also in series with said digital recording means so as to allow recording, on said magnetic tape, of said first multibit digital code.

14. The apparatus of claim 13 with the addition of depth encoding means in circuit with said generating and control means of said digital logging system and operative thereby for generating a second multibit digital code indicative of the depth of said polarizing coil within said well bore, said depth encoding means being in series with said digital recording means so as to also allow recording of said second multibit digital code onto said magnetic tape.

* * * * *

PO-1050
(5/69)

UNITED STATES PATENT OFFICE
CERTIFICATE OF CORRECTION

Patent No. 3,775,671      Dated November 27, 1973

Inventor(s) ROBERT J. S. BROWN

It is certified that error appears in the above-identified patent and that said Letters Patent are hereby corrected as shown below:

Col. 4, line 23, after "encoder" (first occurrence) insert --23. In addition to digital logging systems 20, a depth position--;

line 56, after "time" insert --share basis within the digital system 20 in a format compatible--.

Col. 5, line 22, after "record," insert --at the end of the record,--.

Col. 12, line 57, "-" should read --+--.

Signed and sealed this 24th day of December 1974.

(SEAL)
Attest:

McCOY M. GIBSON JR.
Attesting Officer

C. MARSHALL DANN
Commissioner of Patents